US012781057B2

(12) United States Patent
Chiba et al.

(10) Patent No.: US 12,781,057 B2

(45) Date of Patent: Nov. 3, 2026

(54) ACRYLIC RESIN EMULSION, PRODUCTION METHOD THEREFOR, AND COATING COMPOSITION

(71) Applicants: Nissin Chemical Industry Co., Ltd., Echizen (JP); Shin-Etsu Chemical Co., Ltd., Tokyo (JP)

(72) Inventors: Shunsuke Chiba, Echizen (JP); Kentaro Watanabe, Echizen (JP); Yoichi Tonomura, Joetsu (JP); Ayumu Kiyomori, Joetsu (JP)

(73) Assignees: Nissin Chemical Industry Co., Ltd., Echizen (JP); Shin-Etsu Chemical Co., Ltd., Tokyo (JP)

(*) Notice: Subject to any disclaimer, the term of this patent is extended or adjusted under 35 U.S.C. 154(b) by 558 days.

(21) Appl. No.: 18/551,777

(22) PCT Filed: Mar. 23, 2022

(86) PCT No.: PCT/JP2022/013547

§ 371 (c)(1),
(2) Date: Sep. 21, 2023

(87) PCT Pub. No.: WO2022/202905

PCT Pub. Date: Sep. 29, 2022

(65) Prior Publication Data

US 2024/0174864 A1 May 30, 2024

(30) Foreign Application Priority Data

Mar. 25, 2021 (JP) ................................ 2021-052151

(51) Int. Cl.

| | |
|---|---|
| ***C09D 7/65*** | (2018.01) |
| ***C09D 5/02*** | (2006.01) |
| ***C09D 133/06*** | (2006.01) |
| ***C09D 143/04*** | (2006.01) |

(52) U.S. Cl.

CPC ............ *C09D 5/022* (2013.01); *C09D 5/027* (2013.01); *C09D 7/65* (2018.01); *C09D 133/062* (2013.01); *C09D 143/04* (2013.01)

(58) Field of Classification Search

CPC .......... C09D 5/022; C09D 5/027; C09D 7/65; C09D 133/062; C09D 143/04; C09D 5/1668; C09D 7/45; C09D 133/06; C09D 133/14; C08F 265/06; C08F 230/08; C08F 2/24

USPC ........................................................ 524/501

See application file for complete search history.

(56) References Cited

U.S. PATENT DOCUMENTS

| | | | |
|---|---|---|---|
| 5,331,055 A | 7/1994 | Fujiwara et al. | |
| 6,110,990 A | 8/2000 | Nakamura et al. | |
| 2012/0029119 A1* | 2/2012 | Dombrowski ...... | C04B 40/0042 977/773 |

FOREIGN PATENT DOCUMENTS

| | | |
|---|---|---|
| JP | H05320261 A | 12/1993 |
| JP | H07268022 A | 10/1995 |
| JP | H0948946 A | 2/1997 |
| JP | 2000169509 A | 6/2000 |
| JP | 2005082725 A | 3/2005 |
| JP | 2006052284 A | 2/2006 |
| JP | 3940297 B2 | 4/2007 |
| JP | 2008280469 A | 11/2008 |
| JP | 2019160518 A | 9/2019 |
| WO | 2017164283 A1 | 9/2017 |

OTHER PUBLICATIONS

English Translation of JP 2006052284 (Year: 2006).*

Extended European Search Report corresponding to EP22775687.1, Feb. 26, 2025, 8 pp.

English translation of International Search Report corresponding to International Patent Application No. PCT/JP2022/013547 (2 pages) (mailed Jun. 14, 2022).

Japan Surfactant Industry Association website (https://jp-surfactant.jp/proddb/product/12000053/) Eleminolic ES-70 (2 pages) (2022).

* cited by examiner

*Primary Examiner* — Hannah J Pak

(74) *Attorney, Agent, or Firm* — Myers Bigel, P.A.

(57) ABSTRACT

Described is an acrylic resin emulsion, a method for preparing the acrylic resin emulsion, and a coating composition. The present invention provides an acrylic resin emulsion comprising: an acrylic resin, which is a polymerized product of (A) 20 to 80 parts by mass of a polymerizable group-containing triorganosilyl ester monomer, (B) 20 to 80 parts by mass of a (meth) acrylic acid alkyl ester monomer having no functional group, and (C) 0 to 60 parts by mass of a polymerizable group and functional group-containing monomer other than components (A) and (B), provided that a total mass of said components (A) to (C) is 100 parts by mass; and (D) 5 to 70 parts by mass of a polymeric emulsifier having a number average molecular weight of 1,000 or more, relative to the total 100 parts by mass of said components (A) to (C); and water.

13 Claims, No Drawings

ACRYLIC RESIN EMULSION, PRODUCTION METHOD THEREFOR, AND COATING COMPOSITION

TECHNICAL FIELD

The present invention relates to an acrylic resin emulsion, and more specifically relates to an acrylic resin emulsion capable of forming a film having excellent transparency, water resistance, salt water resistance, and water repellency, and a method for preparing the acrylic resin emulsion. Furthermore, the present invention relates to a coating composition containing the emulsion.

BACKGROUND ART

Conventionally, oil-based resins, rosin-based resins, vinyl-based resins, acrylic-based resins, chlorinated rubber-based resins, and the like have been widely used as binders of coating materials for articles used in water and in sea water. However, these are all solvent diluting type binders.

However, recently, dispersion media have transitioned from organic solvent-based type to water-based type, in terms of environmental problems. There are many kinds of acrylic-based resin emulsion monomers, which are generally and often used because they are easily designed. However, it is often the case that acrylic resin emulsions with a surfactant are highly transparent, but they have significantly inferior water resistance.

In order to solve that point, progress has been made in the development of acrylic-based resin emulsions with enhanced water resistance. Japanese Patent Application Laid-Open No. Hei 7-268022 (1995) discloses an acrylic resin emulsion obtained by emulsion polymerization with a water-soluble salt of a modified styrene-(meth) acrylic acid ester-unsaturated carboxylic acid copolymer as a protective colloid. Further, Japanese Patent Application Laid-Open No. 2008-280469 discloses that an acrylic-based aqueous emulsion composition with PVA as a dispersant has high water resistance.

However, water resistance can be obtained by these methods, but transparency of a film may be impaired in some cases. When an acrylic resin emulsion is used as a coating material, the color of the coating material becomes less vibrant when transparency is impaired. Therefore, development of an acrylic resin emulsion with transparency and water resistance is desired.

Meanwhile, a triorganosilyl group-containing monomer has been conventionally known as a monomer having water resistance. For example, Japanese Patent Application Laid-Open No. 2005-82725 and WO2017/164283 disclose coating compositions containing copolymers of triisopropylsilyl methacrylate and acrylic monomers. However, both are organic solvent-based compositions, so that there are risks from the viewpoint of VOC regulations or of health damage due to the exposure of painters to organic solvents. Therefore, development of an environment-friendly water-based emulsion is desired.

Japanese Patent Application Laid-Open No. 2006-052284 discloses an aqueous dispersion obtained by emulsion polymerization of a mixture comprising triisopropylsilyl methacrylate and another polymerizable unsaturated monomer.

PRIOR LITERATURES

Patent Literature 1: Japanese Patent Application Laid-Open No. Hei 7-268022 (1995)

Patent Literature 2: Japanese Patent Application Laid-Open No. 2008-280469

Patent Literature 3: Japanese Patent Application Laid-Open No. 2005-82725

Patent Literature 4: WO2017/164283

Patent Literature 5: Japanese Patent Application Laid-Open No. 2006-052284

DISCLOSURE OF THE INVENTION

Problems to be Solved by the Invention

However, the aqueous dispersion disclosed in the aforementioned Patent Literature 5 has room for improvement in terms of transparency and salt water resistance.

The present invention has been made in view of the above circumstances, and an object of the present invention is to provide an acrylic resin emulsion that provides a coating film having transparency, water resistance, salt water resistance, and water repellency, a method for preparing the acrylic resin emulsion, and a coating composition.

Solutions To The Problems

As a result of serious examination to achieve the aforementioned object, the present inventor has found that an acrylic resin emulsion obtained by emulsifying and polymerizing (A) a polymerizable group-containing triorganosilyl ester monomer, (B) a (meth) acrylic acid alkyl ester monomer, and (C) another optional polymerizable group-containing monomer in the presence of (D) a specific polymeric emulsifier provides a coating film having transparency, water resistance, salt water resistance, and water repellency, leading them to achieve the present invention.

That is, the present invention provides the following acrylic resin emulsion, a method for preparing the acrylic resin emulsion, and a coating composition.

The acrylic resin emulsion comprises:

an acrylic resin, the acrylic resin being a polymerized product of the following components (A) to (C), (A) 20 to 80 parts by mass of a polymerizable group-containing triorganosilyl ester monomer, (B) 20 to 80 parts by mass of a (meth) acrylic acid alkyl ester monomer having no functional group, and (C) 0 to 60 parts by mass of a polymerizable group and functional group-containing monomer other than components (A) and (B), provided that a total mass of said components (A) to (C) is 100 parts by mass; and (D) 5 to 70 parts by mass of a polymeric emulsifier having a number average molecular weight of 1,000 or more, relative to the total 100 parts by mass of said components (A) to (C); and water.

In the present invention, the "(meth) acrylic acid alkyl ester monomer" refers to at least one of an acrylic acid alkyl ester monomer and a methacrylic acid alkyl ester monomer. Further, the "polymeric emulsifier" refers to an emulsifier having a high molecular weight. More specifically, the "polymeric emulsifier" is a high molecular compound having an emulsifying function.

Effects of the Invention

The acrylic resin emulsion of the present invention provides a coating film having transparency, water resistance, salt water resistance, and water repellency. A coating film obtained from a coating composition containing the emulsion has excellent water resistance and coloring development. Further, since the emulsion of the present invention is water-based, it has significant operational and environmental advantages. Furthermore, the emulsion of the present invention has excellent long-term preservation stability.

DESCRIPTION OF PREFERRED EMBODIMENTS

The acrylic resin emulsion of the present invention is prepared by emulsifying and polymerizing (A) a polymerizable group-containing triorganosilyl ester monomer, (B) an acrylic acid alkyl ester monomer and/or a methacrylic acid alkyl ester monomer, and as necessary, (C) another functional group-containing monomer capable of being copolymerized with component (A) and component (B) in the presence of (D) a specific polymeric emulsifier.

Each component will be described in detail below.

(A) Polymerizable Group-Containing Triorganosilyl Ester Monomer

The polymerizable group-containing triorganosilyl ester monomer is a monomer having a triorganosilyl group and a polymerizable group. The polymerizable group is, for example, a monovalent hydrocarbon group having 2 to 24 carbon atoms, having a polymerizable unsaturated double bond, and which may have a hetero atom. Examples of the polymerizable group include, for example, a group derived from (meth) acrylic acid, a group derived from 4-pentenoic acid, a group derived from maleic acid, and a group derived from fumaric acid.

Component (A) is preferably represented by the following general formula (I).

(I)

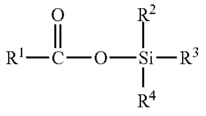

$R^1$ is a monovalent organic group having 2 to 24 carbon atoms and a polymerizable unsaturated double bond, and which may have a hetero atom, $R^2$ to $R^4$ are, independently of each other, a monovalent linear or branched hydrocarbon group having 3 to 10 carbon atoms, or a monovalent cyclic hydrocarbon group having 3 to 10 carbon atoms.

In the formula (I), $R^1$ is a monovalent organic group which has 2 to 24 carbon atoms, preferably 2 to 15 carbon atoms, and more preferably 2 to 10 carbon atoms, and has a polymerizable unsaturated double bond, and may have a hetero atom. For example, $R^1$ is a monovalent hydrocarbon group which has 2 to 10 carbon atoms, preferably 2 to 6 carbon atoms, and a polymerizable unsaturated double bond; and groups represented below are more preferred.

$CH_2{=}C(CH_3)—CH_2{=}CH—CH_2{=}CH—CH_2—CH_2$-

In the monovalent organic group that may have a hetero atom, the hetero atom is an oxygen atom, a nitrogen atom, and a silicon atom, and the like. More specifically, $R^1$ is a monovalent hydrocarbon group having 2 to 24 carbon atoms, preferably 2 to 10 carbon atoms, having a polymerizable unsaturated double bond, and having a hetero atom; and groups represented by the following formula are preferred.

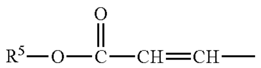

-continued

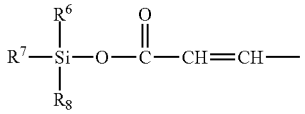

In the above, examples of $R^5$ include a linear, branched, or cyclic alkyl group, unsaturated alkyl group, and aralkyl group having 1 to 8 carbon atoms. Examples of the linear or branched alkyl group having 1 to 8 carbon atoms include a methyl group, an ethyl group, a n-propyl group, an isopropyl group, an n-butyl group, an isobutyl group, an s-butyl group, a t-butyl group, a 2-methylbutyl group, a 2-ethylbutyl group, an n-pentyl group, a 3-methylpentyl group, a hexyl group, a heptyl group, and an octyl group. Examples of the cyclic alkyl group include a cyclopropyl group, a cyclobutyl group, a cyclopentyl group, a cyclohexyl group, a cycloheptyl group, and a cyclooctyl group. Examples of the unsaturated alkyl group include a 2-propenyl group, a 2-butenyl group, a 3-butenyl group, a 2-pentenyl group, a 3-pentenyl group, and a 4-pentenyl group. Examples of the aralkyl group include a benzyl group, a phenethyl group, and a phenylpropyl group. The alkyl group, the cycloalkyl group, the unsaturated alkyl group and the aralkyl group may have substituents.

Examples of the substituents include an alkoxy group and an acyl group. The number and substitution position of the substituents are not particularly limited and they may fall within a range in which the effects of the present invention are not inhibited. $R^5$ is preferably a linear, branched, or cyclic alkyl group having 1 to 8 carbon atoms.

$R^6$ to $R^8$, independently of each other, represent a branched alkyl group having 3 to 8 carbon atoms or a phenyl. Examples of the branched alkyl group having 3 to 8 carbon atoms include an isopropyl group, an isobutyl group, an s-butyl group, a t-butyl group, a 2-methylbutyl group, an isopentyl group, a 2-ethylbutyl group, and a 3-methylpentyl group. In particular, an isopropyl group, an s-butyl group, a t-butyl group, and a phenyl group are preferred as $R^6$ to $R^8$, and an isopropyl group is more preferred.

More preferably, component (A) is represented by the following general formula (I') or (II).

(I')

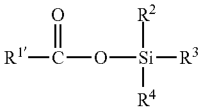

(II)

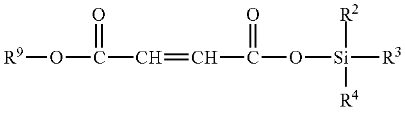

In the formula (I'), $R^{1'}$ is a monovalent hydrocarbon group having 2 to 10 carbon atoms, and having a polymerizable unsaturated double bond. $R^{1'}$ is preferably a monovalent hydrocarbon group having 2 to 6 carbon atoms, and groups represented below are more preferred.

$CH_2{=}C(CH_3)—CH_2{=}CH—CH_2{=}CH—CH_2—CH_2$-

In particular, $R^{1'}$ is preferably $CH_2{=}C(CH_3)$- or $CH_2{=}CH$-.

In the formula (II), $R_9$ is a group represented by the $R^5$ or a triorganosilyl group represented by the $R^6R^7R^8Si$-.

That is, $R^9$ is a linear, branched, or cyclic alkyl group, unsaturated alkyl group, or aralkyl group having 1 to 8 carbon atoms, or a group represented by $R^6R^7R^8Si$-, while $R^6$ to $R^8$ are, independently of each other, a branched alkyl group having 3 to 8 carbon atoms or a phenyl.

In the formulas (I), (I'), and (II), $R^2$ to $R^4$ are, independently of each other, a linear or branched monovalent hydrocarbon group having 3 to 10 carbon atoms, and preferably 3 to 8 carbon atoms, or a monovalent cyclic hydrocarbon group having 3 to 10 carbon atoms, and preferably 3 to 8 carbon atoms. Examples of the linear monovalent hydrocarbon group include alkyl groups such as an n-propyl group, an n-butyl group, an n-pentyl group, a hexyl group, a heptyl group, and an octyl group. The branched monovalent hydrocarbon group is preferably a secondary or tertiary alkyl group having a monovalent hydrocarbon group at the α-position or β-position carbon atom. Here, the α-position carbon atom is a carbon atom bonded to the silicon atom in the formulas, while the β-position carbon atom is a carbon atom positioned next to the α-position carbon atom. It is sufficient that the monovalent hydrocarbon group bonded to the α-position or β-position carbon atom is a methyl group, an ethyl group, or the like. Examples of the branched monovalent hydrocarbon group include an isopropyl group, an isobutyl group, an s-butyl group, a t-butyl group, a 2-methylbutyl group, an isopentyl group, a 2-ethylbutyl group, and a 3-methylpentyl group. Examples of the monovalent cyclic hydrocarbon group having 3 to 10 carbon atoms include a phenyl group, a benzyl group, and a cyclohexyl group. In particular, an isopropyl group, an s-butyl group, a t-butyl group, and a phenyl group are preferred as $R^2$ to $R^4$, while an isopropyl group is more preferred.

Examples of component (A) include triorganosilyl group-containing monomers such as a triisopropylsilyl group-containing monomer, a triisobutylsilyl group-containing monomer, a tri-s-butylsilyl group-containing monomer, a triisopentylsilyl group-containing monomer, a triphenylsilyl group-containing monomer, a diisopropyl isobutylsilyl group-containing monomer, a diisopropyl s-butylsilyl group-containing monomer, a diisopropyl isopentylsilyl group-containing monomer, a diisopropyl phenylsilyl group-containing monomer, an isopropyl diisobutylsilyl group-containing monomer, an isopropyl di-s-butylsilyl group-containing monomer, a t-butyl diisobutylsilyl group-containing monomer, a t-butyl diisopentylsilyl group-containing monomer, and a t-butyldiphenylsilyl group-containing monomer. For these triorganosilyl group-containing monomers, one kind can be used alone, or two or more kinds can be used in combination. Among these, the triisopropylsilyl group-containing monomer, the tri-s-butylsilyl group-containing monomer, and the t-butyldiphenylsilyl group-containing monomer are preferred in particular, and the triisopropylsilyl group-containing monomer is more preferred. In particular, from the aspects of manufacturing processes, manufacturing costs, ease of obtaining raw materials, and environmental safety, the triisopropylsilyl group-containing monomer in which all of $R^2$ to $R^4$ are the isopropyl group is preferred as the triorganosilyl group-containing monomer.

Examples of component (A) include triisopropylsilyl (meth) acrylate, triisopropylsilyl 4-pentenoate, bis (triisopropylsilyl) maleate, methyl triisopropylsilyl maleate, ethyl triisopropylsilyl maleate, n-butyl triisopropylsilyl maleate, isobutyl triisopropylsilyl maleate, t-butyl triisopropylsilyl maleate, n-pentyl triisopropylsilyl maleate, isopentyl tripropylsilyl maleate, 2-ethylhexyl triisopropylsilyl maleate, cyclohexyl triisopropylsilyl maleate, bis (triisopropylsilyl) fumarate, methyl triisopropylsilyl fumarate, ethyl triisopropylsilyl fumarate, n-butyl triisopropylsilyl fumarate, isobutyl triisopropylsilyl fumarate, n-pentyl triisopropylsilyl fumarate, isopentyl triisopropylsilyl fumarate, 2-ethylhexyl triisopropylsilyl fumarate, and cyclohexyl triisopropylsilyl fumarate. One kind of these can be used alone, or two or more kinds can be used. In particular, the triisopropylsilyl (meth) acrylate is preferred. The triisopropylsilyl (meth) acrylate refers to triisopropylsilyl acrylate or triisopropylsilyl methacrylate.

An amount of component (A) is 20 to 80 parts by mass, and preferably 40 to 75 parts by mass, relative to the total 100 parts by mass of components (A) to (C). If the amount is less than 20 parts by mass, there is a risk that an obtained film will not have sufficient water resistance or salt water resistance. If the amount exceeds 80 parts by mass, there is a risk that the minimum film forming temperature (MFT) of an acrylic resin emulsion will exceed 50° C.

(B) (Meth) Acrylic Acid Alkyl Ester Monomer Having no Functional Group

Component (B) is an acrylic acid alkyl ester monomer and/or a methacrylic acid alkyl ester monomer (hereinafter also referred to as an acrylic component). The acrylic acid alkyl ester monomer or methacrylic acid alkyl ester monomer does not have a functional group, such as a hydroxy group, an alkoxy group, an amido group, and a carboxy group. The monomer preferably has an alkyl group having 1 to 10 carbon atoms at an end of the ester. It is preferred that the monomer is one in which a polymer of the acrylic component preferably has a glass-transition temperature (hereinafter also referred to as Tg) of 40° C. or higher, and preferably 60° C. or higher. Examples of the monomer include methyl methacrylate, isopropyl methacrylate, ethyl methacrylate, cyclohexyl methacrylate, 2-ethylhexyl acrylate, and butyl acrylate. The upper limit of Tg is preferably 200° C. or lower, and further preferably 150° C. or lower. The glass-transition temperature may be measured based on the Japanese Industrial Standards (JIS) K7121.

An amount of component (B) is 20 to 80 parts by mass, and preferably 25 to 75 parts by mass, relative to the total 100 parts by mass of components (A) to (C). If the amount is less than 20 parts by mass, there is a risk that an emulsion polymerization reaction will not advance. If the amount exceeds 80 parts by mass, there is a risk that an obtained film will not have water resistance.

Another functional group-containing monomer (C) capable of being copolymerized with component (A) and component (B) may be copolymerized. It is sufficient that component (C) is a monomer having an unsaturated bond, which may have a functional group such as a carboxy group, an amido group, a hydroxy group, an alkoxy group, a vinyl group, or an allyl group. Examples of component (C) include methacrylic acid, acrylic acid, acrylamide, allyl methacrylate, vinyl methacrylate, 2-methoxyethyl acrylate (methoxyethyl acrylate), 2-hydroxyethyl methacrylate, and 2-hydroxypropyl methacrylate. Copolymerization of these makes it possible to improve compatibility between a core-shell resin and a thermoplastic resin. The methacrylic acid, acrylic acid, 2-methoxyethyl acrylate, and 2-hydroxyethyl methacrylate are preferred.

An amount of component (C) is 0 to 60 parts by mass, preferably 0.5 to 30 parts by mass, or 1 to 25 parts by mass, and further 5 to 20 parts by mass, relative to the total 100 parts by mass of components (A) to (C). If the amount exceeds 60 parts by mass, a failure occurs in that the emulsion becomes unstable and cannot be polymerized.

(D) Polymeric Emulsifier

It is sufficient that component (D) is any known polymeric emulsifier. The polymeric emulsifier is an emulsifier having a high molecular weight as described above, and more specifically, it is a high molecular compound having an emulsifying function. The high molecular weight is a number (or weight) average molecular weight of 1,000 or more, and preferably 1,000 to 200,000.

A lower limit value of the number average molecular weight is more preferably 3,000 or more, and further preferably 5,000 or more. An upper limit value is preferably 100,000 or less, further preferably 80,000 or less, and further preferably 50,000 or less. If the molecular weight of the emulsifier is less than the above-mentioned lower limit value, there is a risk that inconvenience may occur, that is, generation of aggregates. If the molecular weight exceeds the above-mentioned upper limit value, there is a risk that inconveniences occur, that is, generation of a large amount of aggregates occur, and in the worst case, gelatinization occurs. The number average molecular weight is a polystyrene conversion value measured by GPC.

Further, in the present invention, a compound having a molecular weight of 50,000 or less is called an oligomer.

Examples of the polymeric emulsifier include one or more polymeric emulsifiers selected from a carboxyl group-containing (co) polymer or a salt thereof, a carboxylic acid ester-containing (co) polymer, and a urethane resin. More preferably, examples of the polymeric emulsifier include one or more high molecular compounds selected from poly (meth) acrylic acids, poly (meth) acrylic acid salts, poly (meth) acrylic acid esters, styrene-(meth) acrylic acid copolymers, styrene-(meth) acrylic acid salt copolymers, styrene-(meth) acrylic acid ester copolymers, and polyurethane resins.

Examples of the emulsifiers, which include poly (meth) acrylic acid salts, poly (meth) acrylic acid esters, styrene-(meth) acrylic acid copolymers, styrene-(meth) acrylic acid salt copolymers, or styrene-(meth) acrylic acid ester copolymers, include JONCRYL JDX-6500 (non-volatile content of 30%), JONCRYL JDX-6102B (non-volatile content of 24.5%), JONCRYL HPD-96J (non-volatile content of 34%), and JONCRYL 52J (non-volatile content of 60%) all produced by BASF, and E-1048 and HE-1335 (non-volatile content of 45.5%) produced by Seiko PMC Corporation.

Examples of the poly (meth) acrylic acid include Aron polyacrylate produced by Toagosei Co., Ltd., being a polyacrylic acid type.

Examples of the polyurethane resin include HYDRAN WLS-213 produced by DIC, having a non-volatile content of 34 to 36%.

An amount of the polymeric emulsifier (D) is 5 to 70 parts by mass, and preferably 20 to 60 parts by mass, relative to the total 100 parts by mass of the aforementioned components (A) to (C). Like the afore-mentioned commercial products, when a polymeric emulsifier and a solvent are included, an amount of solid content is 5 to 70 parts by mass, and preferably 20 to 60 parts by mass, relative to the total 100 parts by mass of the afore-mentioned components (A) to (C). When the amount is less than 5 parts by mass, a failure occurs in that many acrylic monomers remain without reacting.

The acrylic resin emulsion of the present invention is obtained by a method of emulsifying and polymerizing the afore-mentioned component (A) and component (B), and as necessary, component (C), in the presence of the polymeric emulsifier (D). Specifically, a mixture of components (A) and (B), and as necessary, component (C), is reacted in the presence of a radical initiator while being added 2 to 10 times or continuously dropped in the polymeric emulsifier (D) within a predetermined time (3 hours or more) under the condition of 50 to 90° C.

Examples of the radical initiator include persulfates such as potassium persulfate and ammonium persulfate, aqueous hydrogen persulfate, t-butyl hydroperoxide, hydrogen peroxide, benzoyl peroxide, and AIBN. A redox system used in combination with a reducing agent such as sodium bisulfite, Rongalite, L-ascorbic acid, tartaric acid, saccharides, and amines may be used as necessary.

Further, a chain transfer agent may be added to control a molecular weight of the polymer.

A polymerization temperature is preferably 50 to 90° C., and further preferably 50 to 70° C.

The acrylic resin emulsion of the present invention has an average particle diameter of 300 nm or less, preferably 50 to 250 nm, and further preferably 50 to 200 nm. When the average particle diameter is too large, a transparent coating material cannot be obtained. When the average particle diameter is too small, there is a problem in that dispersibility decreases. It is also possible to atomize the particles by any known method such as a Star Burst, a high-pressure homogenizer, a continuous emulsification machine, a colloidal mill, and a kneader.

The average particle diameter of the emulsion may be measured by a dynamic light scattering method by, for example, FPAR-1000 produced by Otsuka Electronics.

The acrylic resin emulsion of the present invention preferably has a minimum film forming temperature (MFT) of 50° C. or lower. The temperature is preferably 0 to 50° C., more preferably 0 to 20° C., and further preferably 0 to 15° C. This makes it possible to favorably form a film even under an environment of low room and air temperatures.

When the MFT exceeds the afore-mentioned upper limit value, there is a risk that cracks will occur in a coating film when dried at room temperature. The minimum film forming temperature is a minimum temperature at which a crack-free and uniform film is formed when a coating film composition is dried and can be measured by a method described in JIS K The acrylic resin emulsion preferably has a solid content of 25 to 50 mass %. In addition, the acrylic resin emulsion preferably has a viscosity (25° C.) of 500 mPa·s or less, and further preferably 20 to 300 mPa·s. The viscosity can be measured with a rotational viscosimeter.

The remaining portion of the emulsion is water and may contain an organic solvent as necessary. An amount of water is not particularly limited, and is preferably an amount that allows the solid content of the emulsion to be 25 to 50 mass %.

The acrylic resin emulsion of the present invention has favorable long-term preservation stability and makes it possible to form a coating film having excellent transparency, water resistance, salt water resistance, and water repellency, so that it is suitably used as a coating composition.

In the coating composition of the present invention, other organic resins, antifoulants, pigments, plasticizers, and other additives may be used in addition to the acrylic resin emulsion.

The other organic resins are not particularly limited, and examples include synthetic resins such as chlorinated rubber, vinyl chloride-vinyl acetate copolymers, and vinyl chloride-isobutyl vinyl ether copolymers, and natural resins such as rosin, rosin metal salts, or modified rosin. One kind of these can be used alone, or two or more kinds can be used in combination.

Examples of the antifoulant include, for example, copper compounds such as copper (I) oxide, copper (I) thiocyanate, copper powder, and 2-mercaptopyridine-N-oxide copper, zinc compounds such as 2-mercaptopyridine-N-oxide zinc, bisdimethyldithiocarbamoyl zinc ethylene bisdithiocarbamate, and zinc dimethyldithiocarbamate, and compounds not including metals such as 2,4,5,6-tetrachloroisophthalonitrile, 3,4-dichlorophenyl dimethyl urea, 4,5-dichloro-2-N-octyl-3-(2H) -isothiazoline, N, N-dimethyl-N'-phenyl (N-fluorodichloromethylthio) sulfamide, tetramethylthiuram disulfide, tetraethylthiuram disulfide, 3-iodo-2-propynyl butylcarbamate, pyridine-triphenylborane, and 2-(methoxycarbonylamino) benzimidazole. One kind of these can be used alone, or two or more kinds can be used in combination.

The pigment is not particularly limited, and examples include, for example, red iron oxide, talc, titanium oxide, silica, calcium carbonate, barium sulfate, calcium oxide, and zinc oxide. One kind of these can be used alone, or two or more kinds can be used in combination.

The plasticizer and other additives are not particularly limited, and examples include, for example, plasticizers such as tricresyl phosphate, dioctyl phthalate, chlorinated paraffin, liquid paraffin, and polybutene, thixotropic agents such as bentonite, polyethylene oxide, and various amide compounds, dyes, anti-foam agents, water binders, and organic solvents. One kind of these can be used alone, or two or more kinds can be used in combination.

The advantage of the present resin of water resistance can be given over a long period of time while the merits of the substrate are maintained when the coating composition of the present invention is applied on one surface or both surfaces of substrates or the substrate is dipped in the coating composition and dried at room temperature to 150° C., the substrates being, for example, such as plastic (such as PET, PI, or artificial leather), glass (such as general-purpose glass or $SiO_2$), metal (such as Si, Cu, Fe, Ni, Co, Au, Ag, Ti, Al, Zn, Sn, Zr, or an alloy thereof), wood, paper, or ceramic (such as a calcined product of an oxide, carbide, or nitride).

Here, examples of a metallic material include SUS and SPHC. Examples of a usage application of the coating of the metallic material include ship bottoms, hulls, vehicle upholstery, vehicle bodies, and building materials.

For the plastic substrate, poly (meth) acrylic acid esters such as polymethyl methacrylate, polycarbonates, polystyrenes, polyethylene terephthalate, polyvinyl chloride, polyesters, celluloses, diethylene glycol bisallyl carbonate polymers, acrylonitrile-butadiene-styrene polymers, polyurethanes, epoxy resins, and the like are used. Examples of plastic processed products include vehicle interior materials and organic glass, electronic materials and building materials, exterior materials for architectural structures, optical films and light diffusion films used for liquid crystal displays, mobile phones, and household products.

For the glass substrate, soda-lime glass, quartz glass, lead glass, borosilicate glass, non-alkali glass, and the like are used. Examples of glass processed products include plate glass for construction, glass for vehicles such as automobiles, glass for lenses, glass for mirrors, glass for display panels, and glass for solar cell modules.

For the wood substrate, lumbers of the family Aceraceae, Betulaceae, Lauraceae, Castanea, Scrophulariaceae, Araucaria, Ulmaceae, Bignoniaceae, Rosaceae, Cupressaceae, Dipterocarpaceae, Myrtaceae, Fagaceae, Pinaceae, Leguminosae, Oleaceae, and the like are used. Wood processed products may be selected from processed and formed products made from wood itself as the raw material, plywood, laminated wood, and processed and formed products thereof, and combinations thereof; and examples include residential architecture materials encompassing materials for building exteriors and interiors, furniture such as desks, wooden toys and musical instruments.

The method of coating the coating composition of the present invention on the substrate is not particularly limited, and examples of the method include coating methods with various coaters such as a gravure coater, a bar coater, a blade coater, a roll coater, an air knife coater, a screen coater, a curtain coater, and a coating brush, a spray coating, and dipping.

An application amount of the coating composition of the present invention on the substrate is not particularly limited. From the viewpoint of coating workability and the like, in terms of solid content, the coating composition is usually formed in a range of preferably 1 to 300 $g/m^2$, and more preferably 5 to 100 $g/m^2$, or at a thickness of 1 to 500 μm, and preferably 5 to 100 μm. The film may be formed by drying at room temperature or heat-drying at 100 to 200° C.

The coating composition of the present invention is suitably used as a coating material for articles used in water and in sea water in particular, and is suitable for underwater coating materials and undersea coating materials. In particular, the coating film obtained from the coating composition of the present invention has suitable salt water resistance, and is suitable for undersea antifouling coating materials applied on surfaces of undersea articles, such as ship bottoms of boats and ships, undersea structures, water conduits of electric power plants, fishing nets for culture fishery or stationary use, or fishing net accessories, such as floats and ropes used for the fishing nets.

EXAMPLES

The present invention will be explained below in further detail with reference to a series of the Examples and the Comparative Examples, though the present invention is in no way limited by these Examples. In the following Examples, "part" and "%" represent part by mass and mass, respectively.

[Acrylic Resin Emulsion]

Example 1

To a 2 L glass flask equipped with a stirring apparatus, a thermometer and a reflux condenser, 770 g of ion exchanged water, 2 g of sodium carbonate, and 630 g of JDX-6500 (polyacrylic acid oligomer) having a number average molecular weight of 10000 and a non-volatile content of 30% were added. The air in the vessel was purged with nitrogen, and the inner solution was heated while being stirred with a stirrer until the temperature of the inner solution reached 60° C. With the temperature of the inner solution maintained at 60° C.±1° C., a mixture of 70 g of 2-ethylhexyl acrylate (2-EHA), 87.5 g of methoxyethyl acrylate (MEA), and 192.5 g of triisopropylsilyl methacrylate (TIPSMA) was added dropwise over a period of 3 hours using a dropping funnel under a nitrogen stream, and while doing so, 1 g of ammonium persulfate (APS) dissolved in 45 g of ion exchanged water was added dropwise over a period of 4 hours to emulsify and polymerize the afore-mentioned mixture. After the reaction completed, the resultant was cooled to 40° C. or lower and dried at 105° C. for 1 hour, then a milky-white acrylic resin emulsion having a non-volatile content (solid content) of 31% was obtained.

Example 2

To a 2 L glass flask equipped with a stirring apparatus, a thermometer, and a reflux condenser, 770 g of ion exchanged water, 2 g of sodium carbonate, and 291.5 g of JDX-6500 (polyacrylic acid oligomer) having a number average molecular weight of 10000 and a non-volatile content of 30% were added. The air in the vessel was purged with nitrogen, and the inner solution was heated while being stirred with a stirrer until the temperature of the inner solution reached 60° C. With the temperature of the inner solution maintained at 60° C.±1° C., a mixture of 87.5 g of methylbutyl acrylate (BA), 70 g of methoxyethyl acrylate (MEA), and 192.5 g of triisopropylsilyl methacrylate (TIPSMA) was added dropwise over a period of 3 hours using a dropping funnel under a nitrogen stream, and while doing so, 1 g of ammonium persulfate (APS) dissolved in 45 g of ion exchanged water was added dropwise over a period of 4 hours to emulsify and polymerize the afore-mentioned mixture. After the reaction completed, the resultant was cooled to 40° C. or lower and dried at 105° C. for 1 hour, then a milky-white acrylic resin emulsion having a non-volatile content (solid content) of 29% was obtained.

Example 3

To a 2 L glass flask equipped with a stirring apparatus, a thermometer, and a reflux condenser, 770 g of ion exchanged water, 2 g of sodium carbonate, and 630 g of JDX-6500 (polyacrylic acid oligomer) having a number average molecular weight of 10000 and a non-volatile content of 30% were added. The air in the vessel was purged with nitrogen, and the inner solution was heated while being stirred with a stirrer until the temperature of the inner solution reached 60° C. With the temperature of the inner solution maintained at 60° C.±1° C., a mixture of 87.5 g of 2-ethylhexyl acrylate (2-EHA) and 262.5 g of triisopropylsilyl methacrylate (TIPSMA) was added dropwise over a period of 3 hours using a dropping funnel under a nitrogen stream, and while doing so, 1 g of ammonium persulfate (APS) dissolved in 45 g of ion exchanged water was added dropwise over a period of 4 hours to emulsify and polymerize the afore-mentioned mixture. After the reaction completed, the resultant was cooled to 40° C. or lower and dried at 105° C. for 1 hour, then a milky-white acrylic resin emulsion having a non-volatile content (solid content) of 30% was obtained.

Example 4

To a 2 L glass flask equipped with a stirring apparatus, a thermometer, and a reflux condenser, 770 g of ion exchanged water, 2 g of sodium carbonate, and 630 g of JDX-6500 (polyacrylic acid oligomer) having a number average molecular weight of 10000 and a non-volatile content of 30% were added. The air in the vessel was purged with nitrogen, and the inner solution was heated while being stirred with a stirrer until the temperature of the inner solution reached 60° C. With the temperature of the inner solution maintained at 60° C.±1°C, a mixture of 262.5 g of 2-ethylhexyl acrylate (2-EHA) and 87.5 g of triisopropylsilyl methacrylate (TIPSMA) was added dropwise over a period of 3 hours using a dropping funnel under a nitrogen stream, and while doing so, 1 g of ammonium persulfate (APS) dissolved in 45 g of ion exchanged water was added dropwise over a period of 4 hours to emulsify and polymerize the afore-mentioned mixture. After the reaction completed, the resultant was cooled to 40° C. or lower and dried at 105° C. for 1 hour, then a milky-white emulsion having a non-volatile content (solid content) of 30% was obtained.

Example 5

To a 2 L glass flask equipped with a stirring apparatus, a thermometer, and a reflux condenser, 770 g of ion exchanged water, 2 g of sodium carbonate, and 630 g of WLS-213 (urethane resin) having a number average molecular weight of 25000 and a non-volatile content of 30% were added. The air in the vessel was purged with nitrogen, and the inner solution was heated while being stirred with a stirrer until the temperature of the inner solution reached 60° C. With the temperature of the inner solution maintained at 60° C.±1° C., a mixture of 70 g of 2-ethylhexyl acrylate (2-EHA), 87.5 g of methoxyethyl acrylate (MEA), and 192.5 g of triisopropylsilyl methacrylate (TIPSMA) was added dropwise over a period of 3 hours using a dropping funnel under a nitrogen stream, and while doing so, 1 g of ammonium persulfate (APS) dissolved in 45 g of ion exchanged water was added dropwise over a period of 4 hours to emulsify and polymerize the afore-mentioned mixture.

After the reaction completed, the resultant was cooled to 40° C. or lower and dried at 105° C. for 1 hour, then a milky-white emulsion having a non-volatile content (solid content) of 30% was obtained.

Comparative Example 1

To a 2 L glass flask equipped with a stirring apparatus, a thermometer, and a reflux condenser, 770 g of ion exchanged water, 2 g of sodium carbonate, and 630 g of JDX-6500 (polyacrylic acid oligomer) having a number average molecular weight of 10000 and a non-volatile content of 30% were added. The air in the vessel was purged with nitrogen, and the inner solution was heated while being stirred with a stirrer until the temperature of the inner solution reached 60° C. With the temperature of the inner solution maintained at 60° C.±1° C., 350 g of methyl methacrylate was added dropwise over a period of 3 hours using a dropping funnel under a nitrogen stream, and while doing so, 1 g of ammonium persulfate (APS) dissolved in 45 g of ion exchanged water was added dropwise over a period of 4 hours to emulsify and polymerize the afore-mentioned mixture. After the reaction completed, the resultant was cooled to 40° C. or lower and dried at 105° C. for 1 hour, then a milky-white emulsion having a non-volatile content (solid content) of 30% was obtained.

Comparative Example 2

In a 3 L polymerization vessel equipped with a stirrer, a condenser, a thermometer, and a nitrogen gas inlet port, 500 g of ion exchanged water was placed and after purging the air with nitrogen gas for 15 minutes, the temperature was raised to 70° C. Next, in another vessel, 70 g of 2-ethylhexyl acrylate (2-EHA), 87.5 g of methoxyethyl acrylate (MEA), 192.5 g of triisopropylsilyl methacrylate (TIPSMA), 3 g of SANMORIN OT-70 (produced by Kao Corporation), 16 g of NOIGEN XL-41 (produced by DKS), 28 g of NOIGEN XL-400 (produced by DKS), and 400 g of ion exchanged water were mixed and emulsified with a homogenizer to obtain an emulsified liquid, and the emulsified liquid and a mixture of 3 g of potassium persulfate and 100 g of ion exchanged water were separately and uniformly added dropwise to the afore-mentioned polymerization vessel over a period of 4 hours while being stirred. Furthermore, the resultant was reacted at 70° C. for 2 hours to complete polymerization. After cooling, 25% ammonia water was added to adjust the pH to 7. The obtained synthetic resin emulsion had a solid content of 40.4%.

Comparative Example 3

To a 2 L glass flask equipped with a stirring apparatus, a thermometer, and a reflux condenser, 770 g of ion exchanged water, 2 g of sodium carbonate, and 630 g of JDX-6500 (polyacrylic acid oligomer) having a number average molecular weight of 10000 and a non-volatile content of 30% were added. The air in the vessel was purged with nitrogen, and the inner solution was heated while being stirred with a stirrer until the temperature of the inner solution reached 60° C. With the temperature of the inner solution maintained at 60° C.±1°C, a mixture of 192.5 g of methyl methacrylate, 140 g of methoxyethyl acrylate (MEA), and 17.5 g of triisopropylsilyl methacrylate (TIPSMA) was added dropwise over a period of 3 hours using a dropping funnel under a nitrogen stream, and while doing so, 1 g of ammonium persulfate (APS) dissolved in 45 g of ion exchanged water was added dropwise over a period of 4 hours to emulsify and polymerize the afore-mentioned mixture. After the reaction completed, the resultant was cooled to 40° C. or lower and dried at 105° C. for 1 hour, then a milky-white emulsion having a non-volatile content (solid content) of 29% was obtained.

Comparative Example 4

To a 2 L glass flask equipped with a stirring apparatus, a thermometer, and a reflux condenser, 770 g of ion exchanged water, 2 g of sodium carbonate, and 933 g of JDX-6500 (polyacrylic acid oligomer) having a number average molecular weight of 10000 and a non-volatile content of 30% were added. The air in the vessel was purged with nitrogen, and the inner solution was heated while being stirred with a stirrer until the temperature of the inner solution reached 60° C. With the temperature of the inner solution maintained at 60° C.±1° C., 350 g of triisopropylsilyl methacrylate (TIPSMA) was added dropwise over a period of 3 hours using a dropping funnel under a nitrogen stream, and while doing so, 1 g of ammonium persulfate (APS) dissolved in 45 g of ion exchanged water was added dropwise over a period of 4 hours to emulsify and polymerize the triisopropylsilyl methacrylate. After the reaction completed, the resultant was cooled to 40° C. or lower and dried at 105° C. for 1 hour, then a milky-white emulsion having a non-volatile content (solid content) of 29% was obtained.

<Measuring Method of Solid Content>

About 1 g of the resin emulsion (sample) of each

Example was placed in an aluminum foil dish and accurately weighed, placed in a dryer kept at about 105° C., heated for 1 hour, taken out from the dryer, and allowed to cool in a desiccator, then the weight of the sample after drying was measured. An evaporation residue was calculated by the following formula.

$$R = \frac{T - L}{W - L} \times 100$$

R: Evaporation residue (%)

W: Mass of the aluminum foil dish including the sample before drying (g)

L: Mass of the aluminum foil dish (g)

T: Mass of the aluminum foil dish including the sample after drying (g)

Dimensions of the aluminum foil dish: 70 φ×12 h (mm)

<Measuring Method of pH>

The pH of each emulsion was measured at 25° C. by a pH meter according to JIS Z8802 (methods for determination of pH).

<Measuring Method of Minimum Film Forming Temperature (MFT)>

The minimum film forming temperature (MFT) of each emulsion was measured by a method according to JIS K-6828-2. Specifically, a simplified film formation temperature measuring apparatus (produced by Imoto machinery Co., LTD.), in which a heating source and a cooling source were installed at a certain distance from one another, was used. 1 Milliliter of the emulsion was applied on an aluminum foil, and the condition of the coating film was observed after 2 hours with aforesaid apparatus. Then, the emulsion was dried under a temperature gradient, and a boundary temperature between a transparent portion where a film was formed and a portion where a film was not formed was measured and determined as the minimum film forming temperature (MFT, ° C.).

<Measuring Method of Average Particle Diameter of Emulsion Particles>

The afore-mentioned obtained emulsions were further diluted with ion exchanged water to make solutions having a solid content of 0.5 to 2%, then the particle diameters of the emulsions were measured by the dynamic light scattering method with an FPAR-1000 produced by Otsuka Electronics Co. Ltd.

<Evaluation of Preservation Stability>

The emulsions were stored at room temperature (25° C.) for three months. The average particle diameters of the emulsions after storage were measured by the afore-mentioned method. Emulsions having a particle diameter that did not increase in a range exceeding 20% relative to the emulsion right after production were evaluated as good.

<Film Forming Method>

An epoxy resin-based rust-proofing coating material (BANNOH 500S, produced by Chugoku Marine Paints, Ltd.) was coated on a steel plate (produced by Nippon Test panel Co., Ltd., with both surfaces of SPHC undergoing sandblasting treatment) with a brush so that a thickness of a dried film became 100 μm. After drying, an emulsion was coated on the film with a brush so that a thickness of a dried film became 100 μm, and the film was dried at room temperature to make a coating film sample.

<Measurement of Haze Value>

An emulsion was applied on a glass slide (haze value 0.70%) so that a thickness of a dried film became about 7 μm, then the film was dried at room temperature to form a coating film by a bar coater No. 10. The haze value of the glass slide having the afore-mentioned coating film was measured with a "Haze Meter NDH7000" (trade name, produced by NIPPON DENSHOKU INDUSTRIES, Co., Ltd.) .

<Measurement of Water Contact Angle>

A contact angle 30 seconds after a 0.2 μL water droplet was added dropwise to the above-described coating film sample was measured with an automatic Contact Angle Meter DCA-VZ produced by Kyowa Interface Science Co., Ltd.

<Salt Water Resistance>

A solution of sodium chloride dissolved in ion exchanged water to be 3.5% was assumed as a sea water. The above-described coating film sample was dipped in the solution for several days, then the condition of the coating film was observed visually. Then, the condition was observed over time, and the coating film which occurred no whitening, peeling, or cracking was evaluated as having no problem. At the stage where a failure in the film, such as whitening, peeling, or cracking, was observed, the observation was stopped, and that point was determined to be the ending point. Table 1 shows the number of days until each ending point.

SANGYO KAISHA, LTD.) having an average particle diameter of 0.28 μm and being rutile type titanium oxide; and a total 100 parts of Talc MS produced by NIPPON TALC CO., LTD. and glass beads having a diameter of 1 mm were dispersed with a homogenizing disperser at a rotation speed of 3000 rpm for 60 minutes, then filtered through a 100-mesh metal screen to prepare a white paste. In the white paste, 371 parts of the emulsion obtained in Example 1 was added to obtain a coating composition.

Examples 7 to 10, Comparative Examples 6 to 9

The above-described procedure of Example 6 was repeated to obtain coating compositions, except that the compositions of the emulsions were changed to those in Table 2 below.

<Film Forming Method>

An epoxy resin-based rust-proofing coating material (BANNOH 500S, produced by Chugoku Marine Paints,

TABLE 1

| | | Example | | | | | Comparative Example | | | | |
|---|---|---|---|---|---|---|---|---|---|---|---|
| | | 1 | 2 | 3 | 4 | 5 | 1 | 2 | 3 | 4 | 5 |
| Composition, part by mass | (A)TIPSMA | 55 | 55 | 75 | 25 | 55 | | 55 | 5 | 100 | |
| | (B)MMA | | | | | | 100 | | 55 | | |
| | (B)BA | | 45 | | | | | | | | |
| | (B)2-EHA | 20 | | 25 | 75 | 20 | | 20 | | | |
| | (C)MEA | 25 | | | | 25 | | 25 | 40 | | |
| | (D)JDX-6500, Solid content | 54 | 25 | 54 | 54 | | 54 | | 54 | 80 | 100 |
| | (D)WLS-213, Solid content | | | | | 54 | | | | | |
| | SANMORIN OT-70 | | | | | | | 0.9 | | | |
| | NOIGEN XL-41 | | | | | | | 4.6 | | | |
| | NOIGEN XL-400D | | | | | | | 8.0 | | | |
| | Solid content, % | 31 | 29 | 30 | 30 | 31 | 30 | 40 | 29 | 29 | 30 |
| Evaluation | pH | 6.7 | 6.7 | 6.7 | 6.6 | 6.7 | 7.9 | 6.5 | 6.3 | 6.7 | 7.7 |
| | MFT, ° C. | 17 | 11 | 20 | 10 | 12 | >60 | <10 | 30 | >60 | >60 |
| | Average particle diameter, nm | 240 | 190 | 300 | 170 | 110 | 50 | 220 | 100 | 1100 | 30 |
| | Average particle diameter after 3 months, nm | 250 | 200 | 300 | 180 | 110 | 300 | 230 | 110 | 1100 | 30 |
| | Preservation stability | Good | Good | Good | Good | Good | Poor | Good | Poor | Good | Good |
| | Water contact angle, ° | 86 | 84 | 87 | 85 | 85 | 91 | 75 | 89.7 | The film was cracked | 83 |
| | Haze value, % | 1.1 | 1.0 | 1.1 | 1.0 | 1.2 | 95 | 2.5 | 1.0 | | 1.1 |
| | Salt water resistance | 30 days or more | 30 days or more | 30 days or more | 30 days or more | 30 days or more | 1 day | 1 day | 3 days | | 7 days |

TIPSMA: Triisopropylsilyl methacrylate, produced by Shin-etsu chemical co. ltd.
MMA: Methyl methacrylate
BA: Butyl acrylate
2-EHA: 2-ethylhexyl acrylate
MEA: Methoxyethyl acrylate
JDX-6500: Polyacrylic acid salt-based oligomer having a number average molecular weight of 10000, produced by BASF
WLS-213: HYDRAN WLS-213 aqueous polyurethane resin having a number average molecular weight of 25000, produced by DIC Corporation

Example 6

Parts of ion exchanged water; 2 parts of BYK-190 (wetting dispersant, produced by BYK-Chemie) ; 20 parts of titanium oxide (TIPAQUE CR-95, produced by ISHIHARA Ltd.) was coated on a steel plate (produced by Nippon Test panel Co., Ltd., with both surfaces of SPHC undergoing sandblasting treatment) with a brush so that a thickness of a dried film became 100 μm. After drying, the above-described coating composition was coated on the coating film with a brush so that a thickness of a dried film became 100 μm, and the film was dried at room temperature to obtain a coating film sample.

Water contact angle and salt water resistance of each coating film sample were evaluated by the above-described methods. The results are shown in Table 2.

TABLE 2

| Part by mass | | Example 6 | Example 7 | Example 8 | Example 9 | Example 10 | Comparative Example 6 | Comparative Example 7 | Comparative Example 8 | Comparative Example 9 |
|---|---|---|---|---|---|---|---|---|---|---|
| Emulsion | Example 1 | 371 | | | | | | | | |
| | Example 2 | | 371 | | | | | | | |
| | Example 3 | | | 371 | | | | | | |
| | Example 4 | | | | 371 | | | | | |
| | Example 5 | | | | | 371 | | | | |
| | Comparative Example 1 | | | | | | 371 | | | |
| | Comparative Example 2 | | | | | | | 278 | | |
| | Comparative Example 3 | | | | | | | | 371 | |
| | Comparative Example 5 | | | | | | | | | 371 |
| | Talc | 5 | 5 | 5 | 5 | 5 | 5 | 5 | 5 | 5 |
| | Titanium oxide | 20 | 20 | 20 | 20 | 20 | 20 | 20 | 20 | 20 |
| | BYK-190 | 2 | 2 | 2 | 2 | 2 | 2 | 2 | 2 | 2 |
| | Ion exchanged water | 25 | 25 | 25 | 25 | 25 | 25 | 118 | 25 | 25 |
| Evaluation | Solid Content, % | 32 | 32 | 33 | 32 | 32 | 32 | 33 | 32 | 32 |
| | Water contact angle, ° | 78 | 76 | 76 | 73 | 75 | 75 | 69 | 72 | 75 |
| | Salt water resistance | 30 days or more | 30 days or more | 30 days or more | 30 days or more | 30 days or more | 3 days | 1 day | 3 days | 7 days |

As shown in Tables 1 and 2, the acrylic resin emulsion of the present invention provides a coating film having transparency, water resistance, salt water resistance and water repellency and, further, also has excellent long-term preservation stability. Additionally, since the acrylic resin emulsion of the present invention has a minimum film forming temperature (MFT) of 50° C. or lower, it is possible to favorably form a film even at room temperature.

The invention claimed is:

1. An acrylic resin emulsion comprising:

an acrylic resin, the acrylic resin being a polymerized product of the following components (A) to (C), (A) 20 to 80 parts by mass of a polymerizable group-containing triorganosilyl ester monomer, (B) 20 to 80 parts by mass of a (meth)acrylic acid alkyl ester monomer having no functional group, and (C) 0 to 60 parts by mass of a polymerizable group and functional group-containing monomer other than components (A) and (B), provided that a total mass of said components (A) to (C) is 100 parts by mass; and (D) 20 to 70 parts by mass of a polymeric emulsifier having a number average molecular weight of 1,000 or more, relative to the total 100 parts by mass of said components (A) to (C); and water, wherein the component (D) is selected from the group consisting of a poly (meth) acrylic acid, a poly (meth) acrylic acid salt, a poly (meth) acrylic acid ester, a styrene-(meth) acrylic acid copolymer, a styrene-(meth) acrylic acid salt copolymer, a styrene-(meth) acrylic acid ester copolymer, a polyurethane resin, and any combination thereof..

2. The acrylic resin emulsion according to claim 1, wherein component (A) is represented by the following general formula (I),

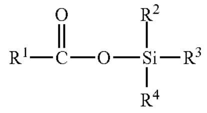

(I)

wherein $R^1$ is a monovalent organic group having 2 to 24 carbon atoms and a polymerizable unsaturated double bond, and which may have a hetero atom; $R^2$ to $R^4$ are, independently of each other, a monovalent linear or branched hydrocarbon group having 3 to 10 carbon atoms, or a monovalent cyclic hydrocarbon group having 3 to 10 carbon atoms.

3. The acrylic resin emulsion according to claim 1, wherein component (D) has a number average molecular weight of 3,000 to 200,000.

4. The acrylic resin emulsion according to claim 1, wherein the acrylic resin emulsion has a minimum film forming temperature (MFT) of 0 to 50° C.

5. The acrylic resin emulsion according to claim 1, wherein component (B) is a (meth)acrylic acid alkyl ester having an alkyl group having 1 to 10 carbon atoms.

6. A coating composition comprising the acrylic resin emulsion according to claim 1.

7. A method for preparing an acrylic resin emulsion, wherein the method comprises the steps of emulsifying and polymerizing (A) a polymerizable group-containing triorganosilyl ester monomer and (B) a (meth) acrylic acid alkyl ester monomer having no functional group, and optional (C) a polymerizable group and functional group-containing monomer other than components (A) and (B);

in the presence of 20 to 70 parts by mass of (D) a polymeric emulsifier having a number average molecular weight of 1,000 or more, relative to the total 100 parts by mass of said components (A) to (C), to obtain the acrylic resin emulsion, wherein the acrylic resin being a polymerized product of (A) 20 to 80 parts by mass of the polymerizable group-containing triorganosilyl ester monomer, (B) 20 to 80 parts by mass of the (meth) acrylic acid alkyl ester monomer having no functional group, (C) 0 to 60 parts by mass of the polymerizable group and functional group-containing monomer other than components (A) and (B), provided that a total mass of said components (A) to (C) is 100 parts by mass; and water, and wherein the component (D) is selected from the group consisting of a poly (meth) acrylic acid, a poly (meth) acrylic acid salt, a poly (meth) acrylic acid ester, a styrene-(meth) acrylic acid copolymer, a styrene-(meth) acrylic acid salt copolymer, a styrene-(meth) acrylic acid ester copolymer, a polyurethane resin, and any combination thereof.

8. The method according to claim 7, wherein component (D) has a number average molecular weight of 3,000 to 200,000.

9. The method according to claim 7, wherein component (A) is represented by the following general formula (I):

(I)

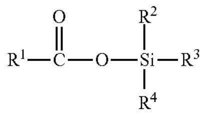

wherein $R^1$ is a monovalent organic group having 2 to 24 carbon atoms and having a polymerizable unsaturated double bond, and which may have a hetero atom, $R^2$ to $R^4$ are, independently of each other, a monovalent linear or branched hydrocarbon group having 3 to 10 carbon atoms, or a monovalent cyclic hydrocarbon group having 3 to 10 carbon atoms.

10. The method according to claim 7, wherein the acrylic resin emulsion has a minimum film forming temperature (MFT) of 0 to 50° C.

11. The method according to claim 7, wherein component (B) is a (meth)acrylic acid alkyl ester having an alkyl group having 1 to 10 carbon atoms.

12. The acrylic resin emulsion according to claim 2, wherein component (D) has a number average molecular weight of 3,000 to 200,000.

13. The method according to claim 8, wherein component (A) is represented by the following general formula (I):

(I)

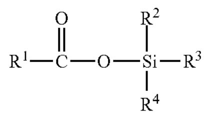

wherein $R^1$ is a monovalent organic group having 2 to 24 carbon atoms and having a polymerizable unsaturated double bond, and which may have a hetero atom, $R^2$ to $R^4$ are, independently of each other, a monovalent linear or branched hydrocarbon group having 3 to 10 carbon atoms, or a monovalent cyclic hydrocarbon group having 3 to 10 carbon atoms.

* * * * *